United States Patent
Oh et al.

(10) Patent No.: US 12,355,877 B2
(45) Date of Patent: Jul. 8, 2025

(54) METHOD FOR SIGNING KEY MANAGEMENT BY ELECTRONIC DEVICE, AND ELECTRONIC DEVICE THEREFOR

(71) Applicant: SAMSUNG ELECTRONICS CO., LTD., Suwon-si (KR)

(72) Inventors: Myeongjin Oh, Suwon-si (KR); Moonkyung Kim, Suwon-si (KR); Seyeong Lee, Suwon-si (KR); Yeongsu Lee, Suwon-si (KR); Jonghyeon Lee, Suwon-si (KR); Yeonggeun Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 17/895,375

(22) Filed: Aug. 25, 2022

(65) Prior Publication Data

US 2022/0417016 A1 Dec. 29, 2022

Related U.S. Application Data

(63) Continuation of application No. PCT/KR2021/002102, filed on Feb. 19, 2021.

(30) Foreign Application Priority Data

Feb. 25, 2020 (KR) .................... 10-2020-0023268

(51) Int. Cl.
*H04L 9/08* (2006.01)
*G06F 8/61* (2018.01)
*H04L 9/14* (2006.01)

(52) U.S. Cl.
CPC .............. *H04L 9/0894* (2013.01); *G06F 8/61* (2013.01); *H04L 9/0838* (2013.01); *H04L 9/14* (2013.01)

(58) Field of Classification Search
CPC ....... H04L 9/0894; H04L 9/0838; H04L 9/14; H04L 9/0891; H04L 9/088; G06F 8/61; G06F 21/64; G06F 21/12; G06F 21/33
(Continued)

(56) References Cited

U.S. PATENT DOCUMENTS 8,387,141 B1  2/2013  Zhukov et al.
8,429,410 B2  4/2013  Little et al.
(Continued)

FOREIGN PATENT DOCUMENTS

EP  1 826 982 A1  8/2007
JP  2003-122588 A  4/2003
(Continued)

OTHER PUBLICATIONS

Communication dated Jul. 17, 2023, issued by European Patent Office in European Patent Application No. 21759910.9.
(Continued)

*Primary Examiner* — Kambiz Zand
*Assistant Examiner* — Aubrey H Wyszynski
(74) *Attorney, Agent, or Firm* — Sughrue Mion, PLLC

(57) ABSTRACT

Disclosed is an electronic device comprising: a memory in which instructions are stored; and a processor electrically connected to the memory. The processor, when the instructions stored in the memory are executed: acquires a command for installation of a first application signed with a first key; checks information relating to the first key in a key storage of the electronic device; if the first key is determined to be valid, installs the first application; and if the first key is determined to have been revoked, controls to prohibit installation of the first application.

17 Claims, 14 Drawing Sheets

(58) Field of Classification Search
USPC .......................................................... 713/191
See application file for complete search history.

(56) References Cited

U.S. PATENT DOCUMENTS

| | | | |
|---|---|---|---|
| 9,894,045 B1* | 2/2018 | Mao | G06F 21/554 |
| 2003/0145317 A1 | 7/2003 | Chamberlain | |
| 2006/0026690 A1 | 2/2006 | Yu et al. | |
| 2007/0087765 A1 | 4/2007 | Richardson et al. | |
| 2011/0244830 A1 | 10/2011 | Chesnutt et al. | |
| 2012/0131349 A1 | 5/2012 | Layson et al. | |
| 2013/0283377 A1 | 10/2013 | Das et al. | |
| 2014/0090077 A1 | 3/2014 | Jeong et al. | |
| 2016/0212104 A1 | 7/2016 | Niemela | |
| 2016/0224769 A1* | 8/2016 | Bushman | G06F 21/6218 |
| 2017/0116427 A1* | 4/2017 | Major | G06F 21/57 |

FOREIGN PATENT DOCUMENTS

| | | |
|---|---|---|
| KR | 10-2014-0044991 A | 4/2014 |
| WO | 2013/063791 A1 | 5/2013 |

OTHER PUBLICATIONS

Communication dated Jun. 9, 2021, issued by the International Searching Authority in counterpart International Application No. PCT/KR2021/002102 (PCT/ISA/210).

Communication dated Jun. 9, 2021, issued by the International Searching Authority in counterpart International Application No. PCT/KR2021/002102 (PCT/ISA/237).

* cited by examiner

| Key ID | Key Hash | Latest Flag | Shared UID |
|---|---|---|---|
| 1 | 38918A453D07199354F8B19AF05EC6562CED5788 | T | com.test.shared |
| ... | ... | ... | ... |

METHOD FOR SIGNING KEY MANAGEMENT BY ELECTRONIC DEVICE, AND ELECTRONIC DEVICE THEREFOR

CROSS-REFERENCE TO RELATED APPLICATION

This application is a bypass continuation of PCT International Application No. PCT/KR2021/002102, which was filed on Feb. 19, 2021, and claims priority to Korean Patent Application No. 10-2020-0023268, filed on Feb. 25, 2020, in the Korean Intellectual Property Office, the disclosure of which is incorporated herein by reference in its entirety.

BACKGROUND

1. Field

The present disclosure relates to a method of managing a signature key of an application package of an electronic device and an electronic device thereof.

2. Description of Related Art

Electronic devices such as smartphones or tablets may include applications providing various functions or services. The applications may be included in the electronic device in a pre-loaded form or may be downloaded to the electronic device through an application market (for example, Google Play Store or App Store).

Such applications may include a developer signature in order to prevent the applications from being falsified by a malicious user or from being replaced with other applications. For example, an application installed in the electronic device may be signed by an application developer key (for example, a developer key). When an already installed application is updated to the latest version, the electronic device may compare signature information of the installed old version application and signature information of a new version application to be installed and, only when the signature information matches, allow installation of the new application, thereby guaranteeing integrity of the application or security of the electronic device.

SUMMARY

When an original signature key (signature information) of an application is leaked, a malicious user may abuse the leaked signature information, and thus it is required to change the stolen original signature key to a new signature key, and accordingly, a technology for changing a signature key is being developed.

However, when an original signature key of an application is changed, signature keys between applications which are signed by the same signature key and use the same shared user ID (UID) may become different.

Various embodiments of the disclosure may provide an electronic device for supporting a consistent key change method by performing signature key-based integrative management beyond a method of managing signature keys for each application package in order to solve the above problems.

According to an aspect of the disclosure, an electronic device may include: a memory storing instructions; and a processor configured to execute the instructions. The processor may be configured to execute the instructions to: acquire a command for installing a first application signed by a first key, identify information on the first key within a key storage space stored in the memory of the electronic device, install the first application in response to determining that the first key is valid based on the identified information, and prevent installation of the first application in response to determining that the first key is discarded based on the identified information.

When identifying the information on the first key, the processor may be further configured to execute the instructions to: identify whether a status flag for the first key among a plurality of keys stored in the key storage space indicates that the first key is valid or that the first key is discarded.

In response to identifying that the information on the first key does not exist within the key storage space, the processor may be further configured to execute the instructions to: install the first application.

In response to identifying that the information on the first key does not exist within the key storage space, the processor may be further configured to execute the instructions to: register the information on the first key in the key storage space.

The key storage space may include a database that stores information on a key of an application installed in the electronic device.

The information on the key of the application installed in the electronic device may include at least one of a history for registration of the key in the key storage space or a history for discarding of the key which has been registered in the key storage space.

The history for discarding of the key may include a history of discarding an original key used to sign when the application is installed in the electronic device registered in the key storage space, when the application is updated by a key different from the original key.

The first application may be signed by an original signature key equal to a second application and may have an equal shared user identification (UID), and the processor may be configured to determine whether to share resources between the first application and the second application according to whether an application list included in the first application identifies the second application.

In response to determining that the first key is discarded based on the identified information, the processor may be further configured to execute the instructions to: determine whether to prevent installation of the first application in response to a user input.

According to an aspect of the disclosure, a method of managing a signature key by an electronic device may include: acquiring a command for installing a first application signed by a first key; identifying information on the first key within a key storage space of the electronic device; installing the first application in the electronic device in response to determining that the first key is valid based on the identified information; and preventing installation of the first application in response to determining that the first key is discarded based on the identified information.

The identifying of the information on the first key within the key storage space may include identifying whether a status flag for the first key among a plurality of keys stored in the key storage space indicates that the first key is valid or that the first key is discarded.

The method may further include: installing the first application, in response to identifying that the information on the first key does not exist within the key storage space; and registering the information on the first key in the key storage space, in response to identifying that the information on the first key does not exist within the key storage space.

The key storage space may include a database that stores information on a key of an application installed in the electronic device.

The information on the key of the application installed in the electronic device may include at least one of a history for registration of the key in the key storage space or a history for discarding of the key which has been registered in the key storage space.

The history for discarding of the key may include a history of discarding of an original key used to sign when the application is installed in the electronic device registered in the key storage space, when the application is updated by a key different from the original key.

According to an aspect of the disclosure, a non-transitory computer readable medium may store computer readable program code or instructions for carrying out operations, when executed by a processor, for managing a signature key by an electronic device. The operations may include: acquiring a command for installing a first application signed by a first key; identifying information on the first key within a key storage space of the electronic device; installing the first application in the electronic device in response to determining that the first key is valid based on the identified information; and preventing installation of the first application in response to determining that the first key is discarded based on the identified information.

The operation of identifying of the information on the first key within the key storage space may include operations for: identifying whether a status flag for the first key among a plurality of keys stored in the key storage space indicates that the first key is valid or that the first key is discarded.

The operations may further include: installing the first application, in response to identifying that the information on the first key does not exist within the key storage space; and registering the information on the first key in the key storage space, in response to identifying that the information on the first key does not exist within the key storage space.

The key storage space may include a database that stores information on a key of an application installed in the electronic device.

The information on the key of the application installed in the electronic device may include at least one of a history for registration of the key in the key storage space or a history for discarding of the key which has been registered in the key storage space.

According to various embodiments of the disclosure, it is possible to prevent fragmentation of a key management method and support a consistent key change solution to an application developer or user by managing a signature key itself in a key storage space beyond a method of managing the signature key for each application package.

According to various embodiments of the disclosure, it is possible to identify, when there is a request for installing an application in an electronic device, information on a signature key signing the corresponding application in the key storage space, thereby identifying whether the corresponding key is valid or discarded and preventing installation of an application having a security problem.

Further, various effects directly or indirectly detected through the disclosure may be provided.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5 illustrates information on a key stored in a package key history table, an embodiment;

DETAILED DESCRIPTION

Figure 1:
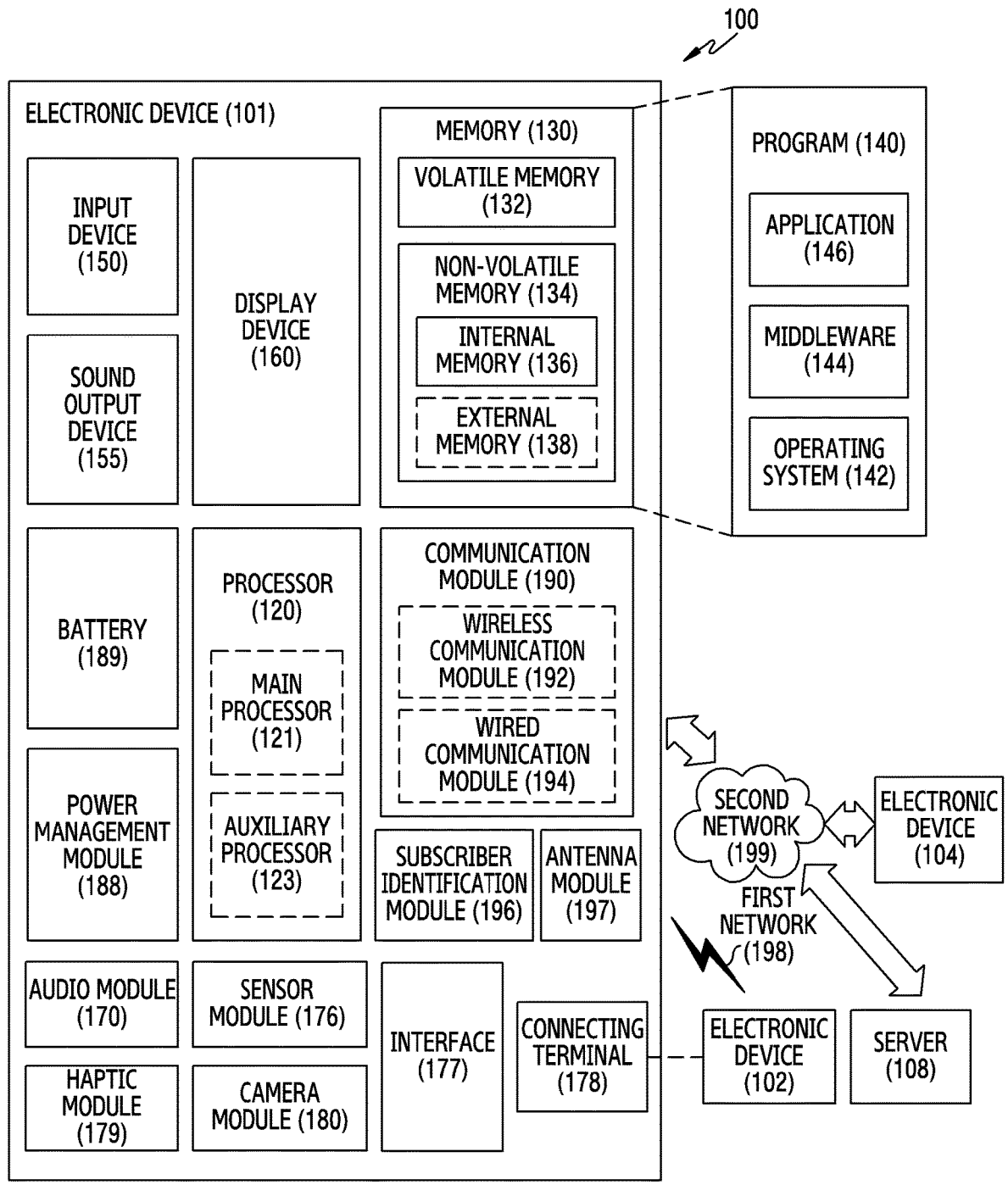
FIG. 1 is a block diagram illustrating an electronic device within a network environment, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. For convenience, elements illustrated in the drawings may be exaggerated or reduced. Also, the various embodiments described herein are not necessarily mutually exclusive, as some embodiments may be combined with one or more other embodiments to form new embodiments. The term "or" as used herein, refers to a non-exclusive or, unless otherwise indicated. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Hereinafter, various embodiments of the disclosure are described with reference to the accompanying drawings, where similar reference characters denote corresponding features consistently throughout.

FIG. 1 is a block diagram illustrating an electronic device 101 in a network environment 100, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
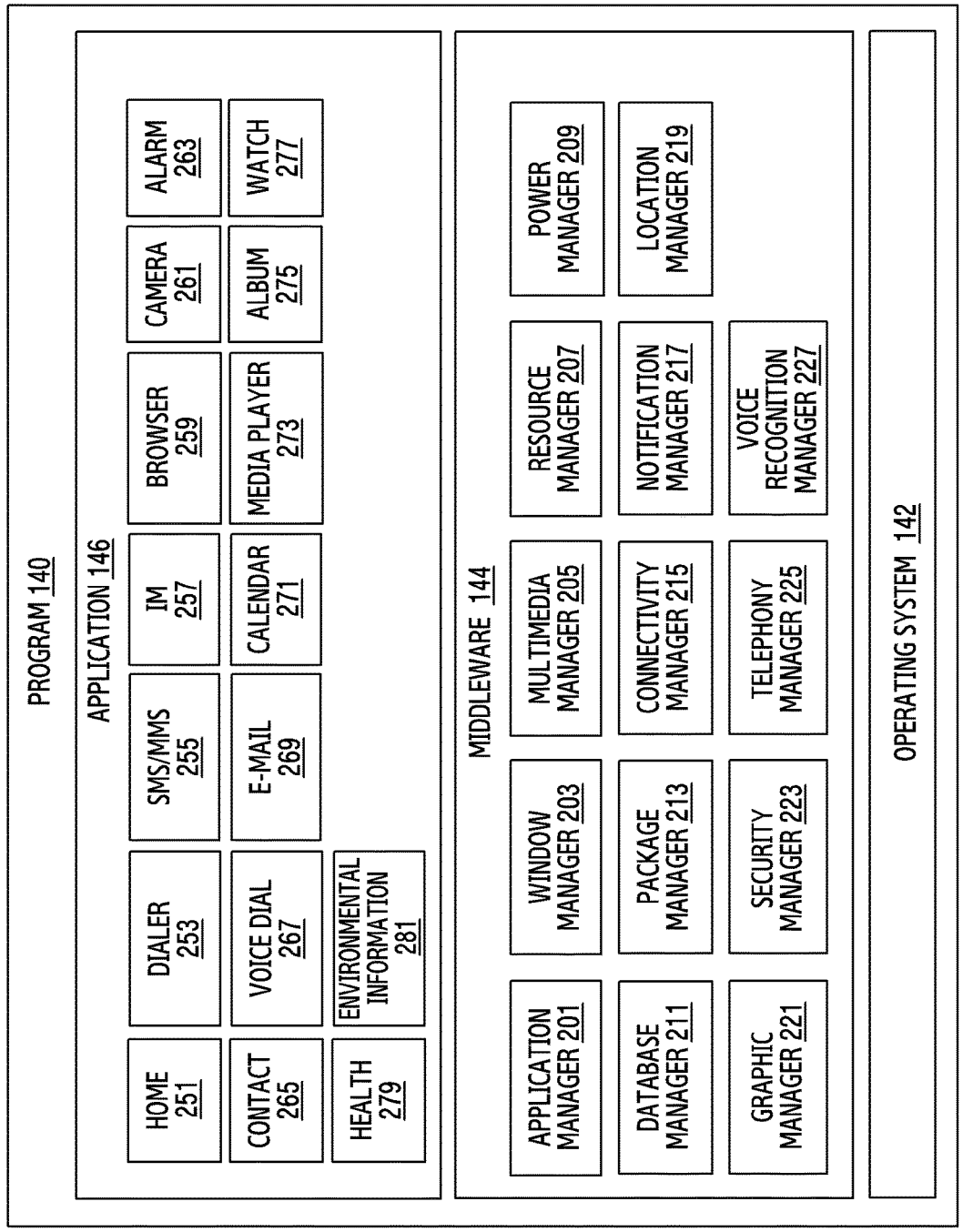
FIG. 2 is a block diagram illustrating a program, according to an embodiment.

FIG. 2 is a block diagram 200 illustrating the program 140, according an embodiment.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bala™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
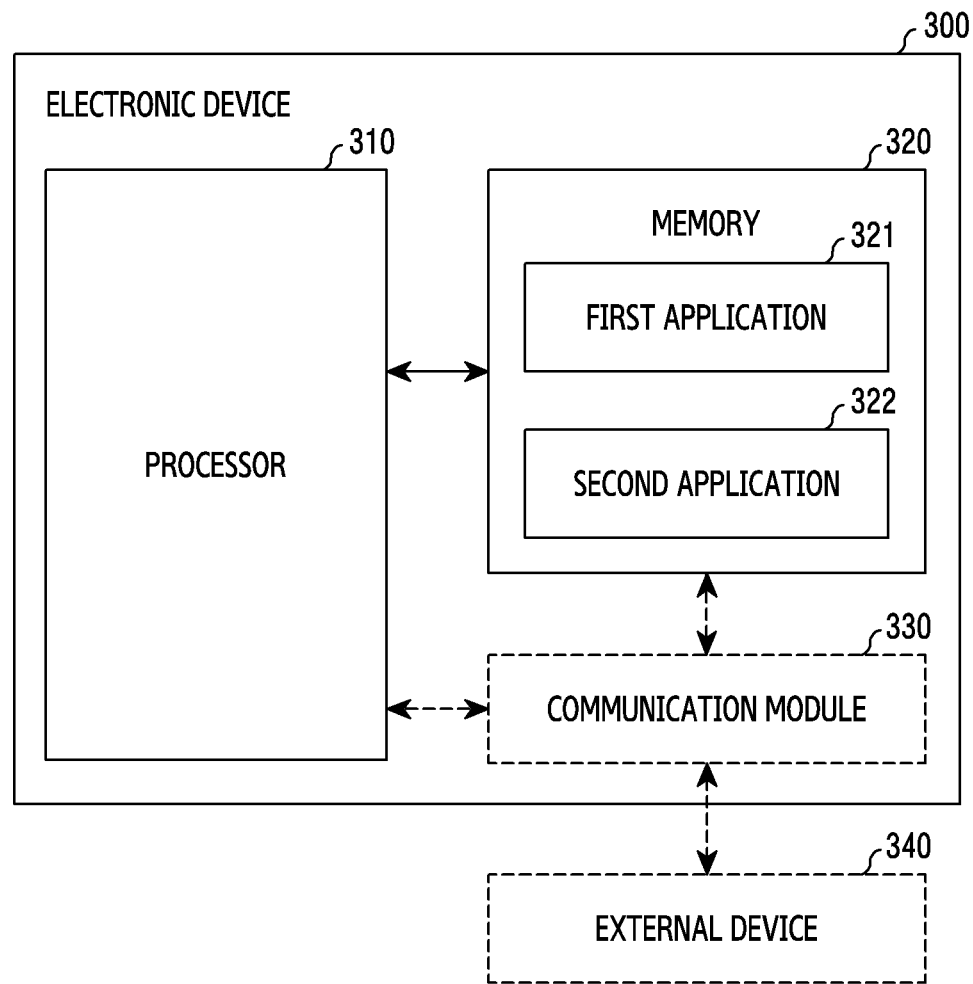
FIG. 3 is a block diagram illustrating an electronic device and an external device capable of communicating with the electronic device, according to an embodiment.

FIG. 3 is a block diagram illustrating an electronic device 300 and an external device 340 capable of communicating with the electronic device 300, according to an embodiment.

Referring to FIG. 3, the electronic device 300 (for example, the electronic device 101 of FIG. 1) may include a processor 310 (for example, the processor 120 of FIG. 1) and a memory 320 (for example, the memory 130 of FIG. 1), and may further include a communication module 330 (for example, the communication module 190 of FIG. 1). However, the elements of the electronic device 300 are not limited thereto, and the electronic device 300 may omit at least one of the elements (for example, the communication module 330) or may further include at least one other element. Hereinafter, each element included in the electronic device 300 is described.

According to an embodiment, the processor 310 may include a customized hardware module or a generic processor configured to execute software (for example, an application program). The processor 310 may include a hardware component (function) or a software component (program) including at least one of various sensors included in the electronic device 300, a data measurement module, an input/output interface, a module for managing a state or an environment of the electronic device 300, and a communication module. The processor 310 may include, for example, one or a combination of two or more of hardware, software, or firmware.

According to an embodiment, the processor 310 may control at least one other element of the electronic device 300 and perform various data processing or calculations. According to an embodiment, the processor 310 may be electrically connected to the memory 320 and the communication module 330 and may execute instructions stored in the memory 320. According to an embodiment, the processor 310 may execute the instructions to acquire a command for installing a first application 321 signed by a first key, identify information on the first key within a key storage space of the electronic device 300, install the first application 321 when it is identified that the first key is valid, and prevent installation of the first application 321 when it is identified that the first key is discarded.

According to an embodiment, the memory 320 may store various pieces of data (for example, application information) used by at least one element of the electronic device 300 (for example, the processor 310). For example, data may include software (for example, the program 140 of FIG. 1) and input data or output data related to thereto. In another example, the memory 320 may store applications (for example, the first application 321 and a second application 322) and information related thereto. According to an embodiment, the memory 320 may include a volatile memory and a nonvolatile memory, and may store at least one command related to a method of managing a signature key of the electronic device 300.

According to an embodiment, the communication module 330 may establish a wired or wireless communication channel between the electronic device 300 and the external device 340 and support communication through the established communication channel.

According to an embodiment, the electronic device 300 may download applications (for example, the first application and the second application) from the external device 340 connected to the electronic device 300 through the communication module 330. For example, the second application 322 may be pre-installed in the memory 320 of the electronic device 300, and the electronic device 300 may download a first application package from the external device 340 in order to newly install the first application 321 in the memory 320. In another example, the first application 321 may be pre-installed in the memory 320 of the electronic device 300, and the electronic device 300 may download a new first application package from the external device 340 in order to update the first application 321.

Hereinafter, the operation of installing the application in the electronic device 300 may include an operation of installing a new application which has never been installed in the electronic device 300 and/or an operation of updating the conventionally installed application to the latest version. For example, the description related to the operation of installing the new application may be applied equally/similarly to the operation of updating the application at a level of those skilled in the art. That is, the operation of installing the application in the electronic device 300 may be downloading the application package from the external device 340 and installing the downloaded application package, and the operation of updating the application pre-installed in the electronic device 300 may be downloading an application package of the latest version having an application package name that is the same as the pre-installed application from the external device 340 and replacing the pre-installed application with the downloaded application package of the latest version.

According to an embodiment, the external device 340 may be a server distributing applications which can be connected to the electronic device 300 through a wireless network. For example, the external device 340 may be an application market server (for example, Google Play Store or App Store) distributing applications which can be used by the electronic device 300. For example, the external device 340 may correspond to an application distribution server, and the electronic device 300 may correspond to a user terminal such as a smartphone or a tablet.

According to an embodiment, the electronic device 300 may correspond to a first user terminal, and the external device 340 may correspond to a second user terminal connected to the first user terminal through a predetermined network (for example, Bluetooth). For example, the electronic device 300 may be a wearable device such as a smart watch, and the external device 340 may correspond to a smartphone. The smart watch may acquire an application package which the smartphone acquired from the server through a cellular network or the like or an installation file for smart watch included in the application package through a predetermined network such as Bluetooth. Thereafter, a description of the electronic device 300 in connection with installation/update of the application and signature management may be equally/similarly applied to the smart watch.

When the electronic device 300 is connected to the external device 340, the electronic device may compare a list of applications stored in the electronic device 300 and version information of each application with version information of the corresponding application registered (or stored) in the external device 340. When the external device 340 includes the latest version application for the application having the same identification information (for example, application (package) name) on the basis of the comparison result, the electronic device 300 may download the latest version application from the external device 340. In this case, the processor 310 may delete the pre-installed application and newly install the latest version application, or may replace at least some of the pre-installed application with at least some of the latest version application.

According to an embodiment, the first application 321 may be signed by a first key, and the second application 322 may be signed by a second key. For example, a developer of the application may sign the first application 321 with a private key and sign the second application 322 with a private key which is the same as or different form the private key. According to an embodiment, information on the first key may be included in a specific file of an installation package of the first application 321, and information on the second key may be included in a specific file of an installation package of the second application 322. In the disclosure, the signature key may be a key signing the application (or a key signing the application package), and the signature key and the key may be interchangeably used.

Figure 4:
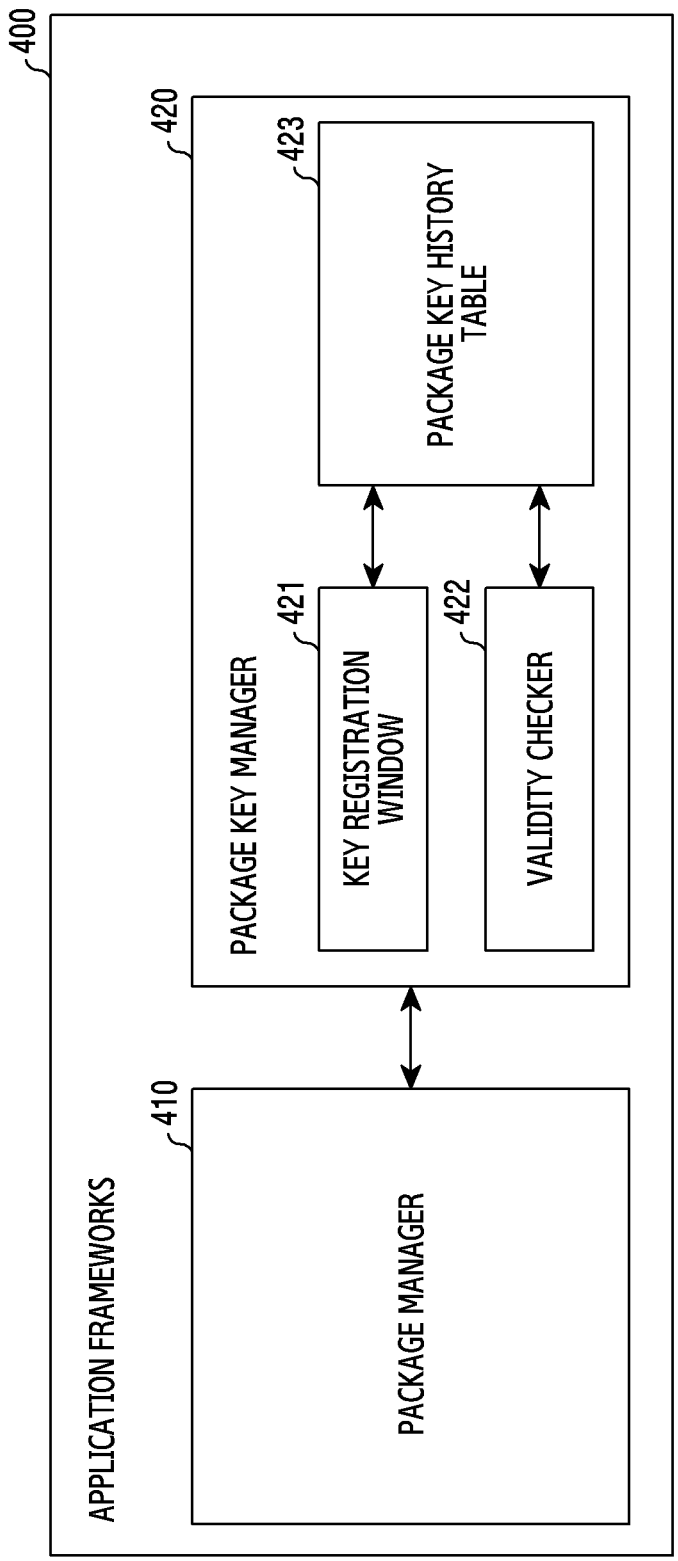
FIG. 4 is a block diagram illustrating application frameworks for managing a signature key of the electronic device, according to an embodiment.

FIG. 4 is a block diagram illustrating application frameworks 400 for managing a signature key of the electronic device, according to an embodiment.

Referring to FIG. 4, the application frameworks 400 (for example, the middleware 144 of FIG. 2) may include a package manager 410 (for example, the package manager 213 of FIG. 2) and a package key manager 420, and the package key manager 420 may include a key registration window 421, a validity checker 422, and a package key history table 423.

The application frameworks 400 illustrated in FIG. 4 may correspond to a conceptual structure of program frameworks according to the Android operating system, but is not limited to the Android operating system, and may be transformed to the form which can be applied to other operating systems (for example, Tizen, iOS, and Windows). According to an embodiment, the operation related to the application frameworks 400 of FIG. 4 may be performed by the processor 310 of FIG. 3.

According to an embodiment, the package manager 410 may be implemented in the application frameworks 400 and may manage information on applications installed in the electronic device 300. The package manager 410 may be a module in which a core mechanism is implemented when the application is installed in, deleted from, or updated in the electronic device 300, and information on the corresponding application may be registered in, removed from, or updated in the memory 320 of the electronic device 300 through the package manager 410 when the application is installed, deleted, or updated. According to an embodiment, information on the application may include an app code path, a user identification (UID), signature information, and/or authority for use for each package name. The package name may be identification information of the application, and the UID may be a unique value of the application. The app code path may be the location of an application package (apk) file within the electronic device, and package information may be extracted using AndroidMnifest, signature information, and the like within the apk file. According to an embodiment, the apk file may include a list of applications recommended to be updated by application developers. According to an embodiment, the package manager 410 may receive information on a key registered in the package key history table 423 through the package key manager 420.

According to an embodiment, the package key manager 420 may be implemented in the application frameworks 400 and may integratively manage signature keys on the basis of the signature keys themselves beyond the conventional method of managing signature key information for each package. According to an embodiment, when the application package is installed (or updated), the package key manager 420 may exchange information on a key of the corresponding application with the package manager 410 and, during such a process, may identify validity of the key and register a new key or discard the conventional key.

According to an embodiment, the key registration window 421 may register a new key in the package key history table 423 when it is required to register a new key, that is, there is a request for installing a new application or a request for updating an application signed by a new key. According to an embodiment, the key registration window 421 may discard the conventional key of the corresponding application when there is a new key is registered.

According to an embodiment, when there is a request for identifying signature key information of the application package installed (or updated) by the package manager 410, the validity checker 422 may provide the result of checking validity of the corresponding signature key from the package key history table 423.

According to an embodiment, the package key history table 423 may store and manage signature key information of the application package installed in the electronic device 300. According to an embodiment, the package key history table 423 may provide information on the corresponding key when there is a request from the validity checker 422, and may register and update the information on the corresponding key when there is a request for registering the key information from the key registration window 421.

According to an embodiment, the package key history table 423 may include a database stored in the memory 320, and the database may store information on the key of the application installed in the electronic device 300. The information on the key may be, for example, information related to at least one of a history about registration of the signature key of the application installed in the electronic device 300 in the package key history table 423 or a history about discarding of the signature key of the application installed in the electronic device 300 which has been registered in the package key history table 423. The history about discarding of the registered signature key may be, for example, a history about discarding of the original key registered in the key history table 423 from the key history table 423 when the corresponding application is updated by a key different from the original key used to sign while the application is initially installed in the electronic device 300. Hereinafter, a configuration for storing information on the signature key in the key history table 423 is described with reference to FIG. 5.

In the method of managing the signature key of the electronic device 300, the names of the package key manager 420, and the key registration window 421, the validity checker 422, and the package key history table 423 included in the package key manager 420 are only examples, and functions thereof are not limited by the names.

FIG. 5 illustrates information on a key stored in the package key history table 423, according to an embodiment.

Referring to FIG. 5, information on the key stored in the package key history table 423 may include a key ID 510, a key hash value 520, latest flag information 530, and/or shared UID information 540. However, the disclosure is not limited thereto, and various other pieces of information may be further included in the package key history table 423. According to an embodiment, the key ID 510 may be an identification value (or unique value) of the corresponding key within the electronic device, and the key hash value 520 may be unique information of the corresponding key. According to an embodiment, the latest flag information 530 may be information related to whether the state of the corresponding key is the latest key, that is, whether the key information is discarded after registration, and, for example, the case in which the state value of the latest flag information 530 is T may indicate that the corresponding key is the latest key and the case in which the state value is F may indicate that the corresponding key is discarded after registration and thus is not valid. According to an embodiment, the indication of the state value of the latest flag information 530 is not limited to T/F, and various other indication methods such as O/X or 0/1 may be used. According to an embodiment, the shared UID information 540 may be information related to a user ID equally used in a plurality of applications which can mutually share resources, and the shared UID may be determined such that the same UID is assigned to a plurality of applications for implementing organic functions such as resource sharing and is shared to facilitate application management.

Figure 6:
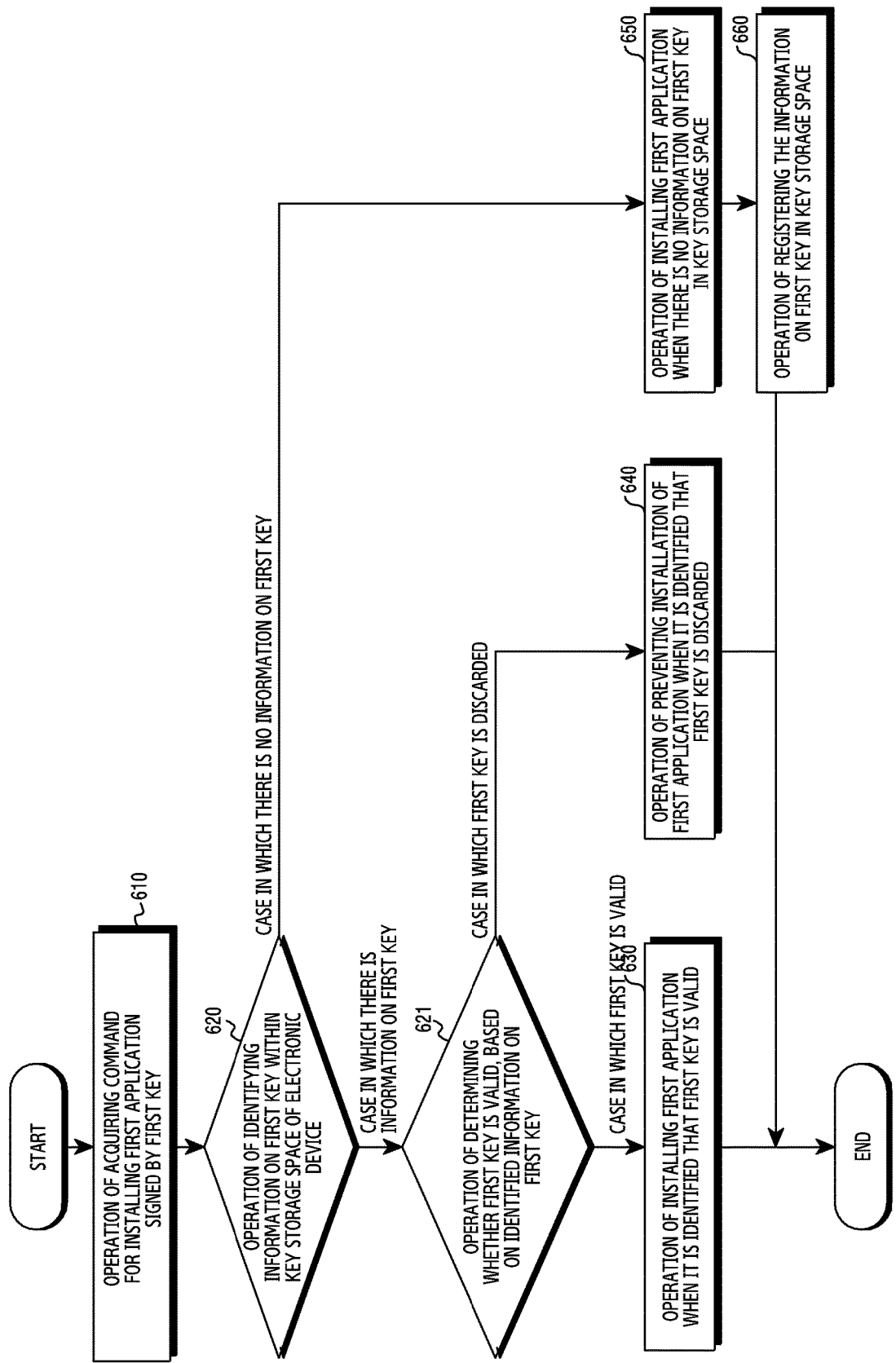
FIG. 6 is a flowchart illustrating a method of managing a signature key by an electronic device, according to an embodiment.

FIG. 6 is a flowchart illustrating a method of managing a signature key by the electronic device 300, according to an embodiment. In the following embodiment, respective operations may be sequentially performed, but the sequential performance is not necessary. For example, orders of the operations may be changed, and at least two operations may be performed in parallel.

The operation in FIG. 6 may be performed by the electronic device 300 of FIG. 3 or the application frameworks 400 of FIG. 4. Referring to FIG. 6, the processor 310 of the electronic device 300 according to an embodiment may perform an operation 610 of acquiring a command for installing the first application 321 signed by a first key, an operation 620 of identifying information on the first key within a key storage space of the electronic device 300 (for example, the package key history table 423 of FIG. 4), an operation 621 of determining whether the first key is valid on the basis of the identified information on the first key, an operation 630 of installing the first application 321 when it is identified that the first key is valid, and an operation 640 of preventing installation of the first application 321 when it is identified that the first key is discarded, and may further perform an operation 650 of installing the first application 321 when there is no information on the first key in the key storage space and an operation 660 of registering the information on the first key in the key storage space when there is no information on the first key in the key storage space. Hereinafter, the flow of each operation is described in detail.

The processor 310 according to an embodiment may acquire the command for installing the first application 321 signed by the first key in operation 610. According to an embodiment, the processor 310 may acquire an input for installing the first application 321 from an input device (for example, a touch display) of the electronic device 300. The processor 310 may identify a signature key (for example, the first key) of the first application 321 when the input is acquired.

The processor 310 according to an embodiment may identify information on the first key within the key storage space of the electronic device 300 (for example, the package key history table 423 of FIG. 4) in operation 620, and determine whether the first key is valid on the basis of the identified information on the first key in operation 621. According to an embodiment, the processor 310 may find the first key by identifying key IDs 510 of keys stored in a table of the package key history table 423 in order to check the information on the first key, identify the latest flag information 530 of the first key to check whether the status flag indicate validity or discarding, and determine whether the first key is valid.

According to an embodiment, when the status flag in the latest flag information 530 indicates validity, the application signed by the first key may be already installed in the electronic device 300. When the status flag indicates discarding, the first key information is discarded from the key storage space as the application is updated by a key different from the first key used to sign while the application is installed in the electronic device 300. The application signed by the first key may be the first application 321, the second application 322 using the same shared UID as the first application, or a third application irrelevant to the first application. When there is no history of installation of the application signed by the first key in the electronic device 300, the information on the first key may not exist in the key storage space.

When it is identified that the first key is valid, the processor 310 according to an embodiment may install the first application 321 in operation 630. According to an embodiment, when it is determined that the first key is valid in operation 621, the processor may install the first application. For example, validity of the first key may mean that the information on the first key exists in the key storage space and there is no history of discarding of the information on the first key. According to an embodiment, identification of validity of the first key in the key storage space by the processor 310 may mean that the processor 310 identifies security safety of the first application 321 signed by the first key. Accordingly, the processor 310 may approve installation of the first application 321.

When it is identified that the first key is discarded, the processor 310 according to an embodiment may prevent installation of the first application 321 in operation 640. According to an embodiment, when it is determined that the first key is not valid in operation 621, that is, when it is identified that the first key is discarded, the processor may stop installation of the first application. For example, discarding of the first key may mean a history indicating that the first key is registered in the key storage space according to installation of the application signed by the first key in the electronic device 300 and then the stored information on the first key is deleted from the key storage space according to an update of the corresponding application by a key different from the first key. According to an embodiment, identification of discarding of the first key from the key storage space by the processor 310 may mean that a problem of security of the first application 321 signed by the first key is identified, and accordingly, the processor 310 may prevent installation of the first application 321.

When there is no information on the first key in the key storage space, the processor 310 according to an embodiment may install the first application 321 in operation 650 and register the information on the first key in the key storage space in operation 660. For example, the nonexistence of the information on the first key in the key storage space may mean that there is no history of installation of the application signed by the first key in the electronic device 300. According to an embodiment, no information on the first key in the key storage space mean that the processor 310 identifies that there is no problem in security of the first application 321 signed by the first key and accordingly may approve installation of the first application 321. According to an embodiment, operation 650 and operation 660 may be performed sequentially, in parallel, simultaneously at the same time, or operation 650 may be performed after operation 660. For example, when there is no information on the first key in the key storage space, the processor 310 may register the information on the first key in the key storage space after installing the first application 321, may install the first application 321 after registering the information on the first key in the key storage space, or may install the first application 321 and register the first key at the same time.

Figure 7:
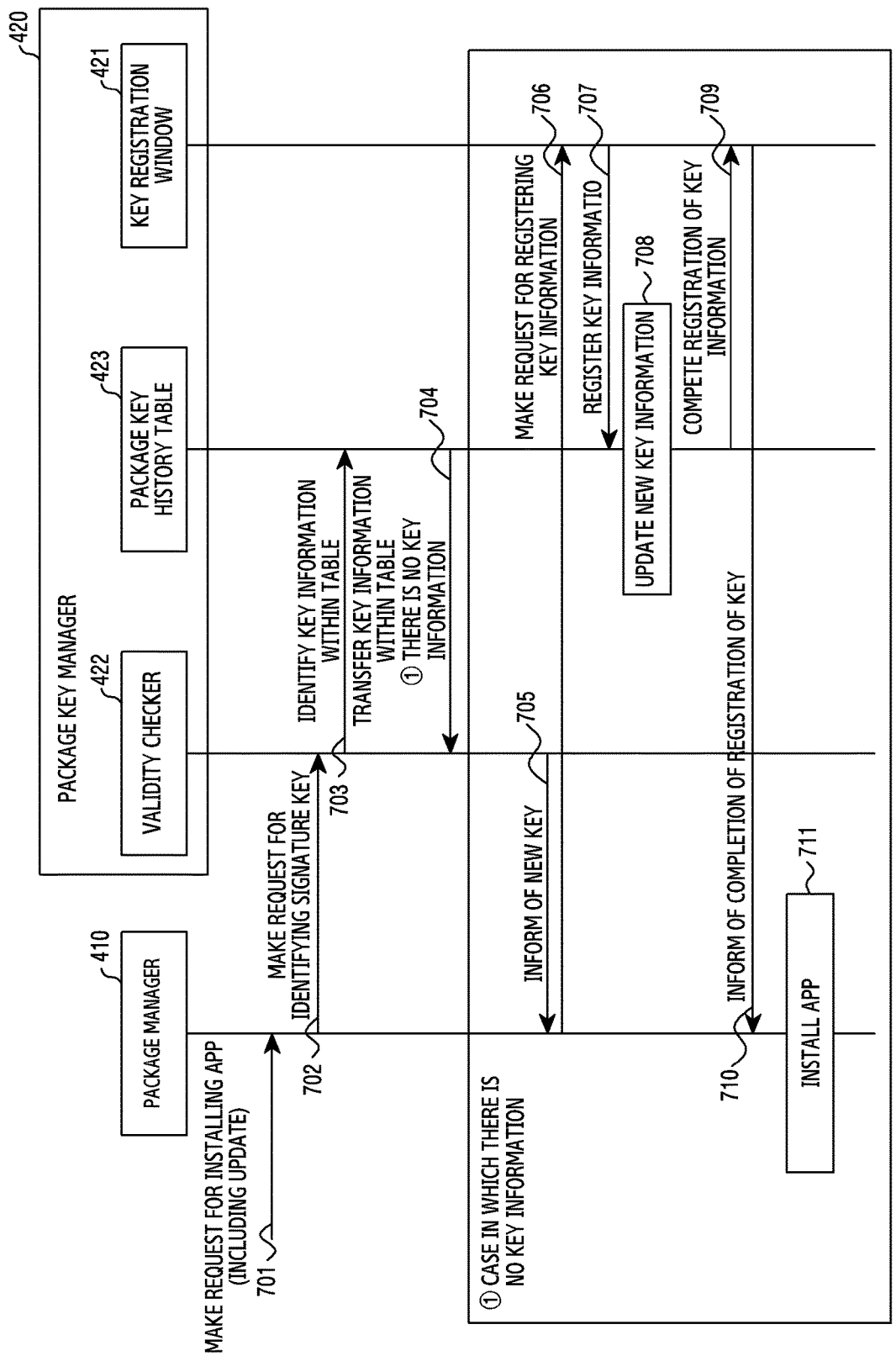
FIG. 7 is a flowchart illustrating a method of determining whether to install an application when there is no signature key information in the package key history table of the electronic device, according to an embodiment.

FIG. 7 is a flowchart illustrating a method of determining whether to install an application when there is no signature key information in the package key history table 423 of electronic device 300, according to an embodiment.

Referring to FIG. 7, in operation 701, the package manager 410 may acquire a request for installing (or updating) an application. When the request is acquired, the package manager 410 may make a request for identifying information on a signature key of the corresponding application to the validity checker 422 in operation 702. In operation 703, the validity checker 422 may check information on the corresponding signature key within the table (for example, database) of the package key history table 423 according to the request in operation 702. In operation 704, the package key history table 423 may transfer the identified information on the signature key to the validity checker 422, for example, information indicating that there is no information on the corresponding signature key within the table. The validity checker 422 may transfer a notification indicating that the corresponding key is a new key to the package manager 410 according to the information received in operation 704 in operation 705, and the package manager 410 may make a request for registering information on the new key to the key registration window 421 in operation 706. The key registration window 421 may make a request for registering the new key information to the package key history table 423 according to the request in operation 706 in operation 707, and the package key history table 423 may register the information on the corresponding new key in the table in operation 708. The package key history table 423 may inform the key registration window 421 of completion of the registration of the new key in operation 709, and the key registration window 421 may finally transfer a notification indicating the completion of the registration of the corresponding key to the package manager 410 according to the information received in operation 709 in operation 710. In operation 711, after identifying completion of the registration of key information in the package key manager 420, the package manager 410 may install (or update) the application requested in operation 701.

Through operations 701 to 711 of FIG. 7, the processor 310 may install applications while security is guaranteed, and may integratively manage signature key information of the applications through the package key history table 423.

Figure 8:
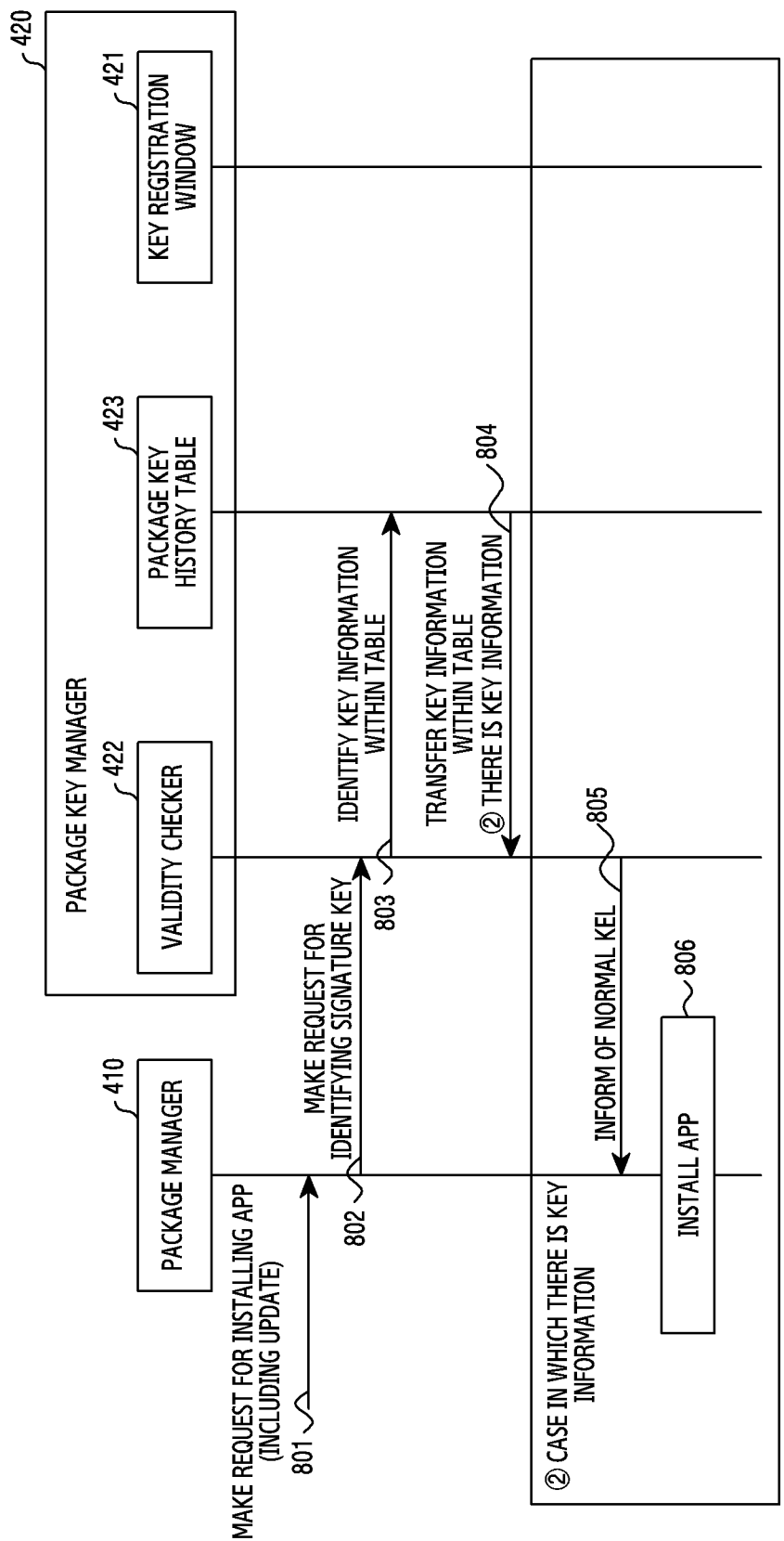
FIG. 8 is a flowchart illustrating a method of determining whether to install an application when signature key information is valid in the package key history table of the electronic device, according to an embodiment.

FIG. 8 is a flowchart illustrating a method of determining whether to install an application when signature key information in the package key history table 423 of the electronic device 300 is valid, according to an embodiment.

Referring to FIG. 8, in operation 801, the package manager 410 may acquire a request for installing (or updating) an application. When the request is acquired, the package manager 410 may make a request for identifying information on a signature key of the corresponding application to the validity checker 422 in operation 802. In operation 803, the validity checker 422 may check information on the corresponding signature key within the table (for example, database) of the package key history table 423 according to the request in operation 802. In operation 804, the package key history table 423 may transfer the identified information on the signature key to the validity checker 422 and, for example, transfer information indicating that the information on the corresponding signature key is valid and stored in the table. The validity checker 422 may transfer a notification indicating that the corresponding key is registered in the package key history table 423 to the package manager 410 according to the information received in operation 804 in operation 805, and the package manager 410 may install (or update) the application requested in operation 801 after identifying that the corresponding key is valid in operation 806.

Through operations 801 to 806 of FIG. 8, the processor 310 may install applications while security is guaranteed, and may integratively manage signature key information of the applications through the package key history table 423.

Figure 9:
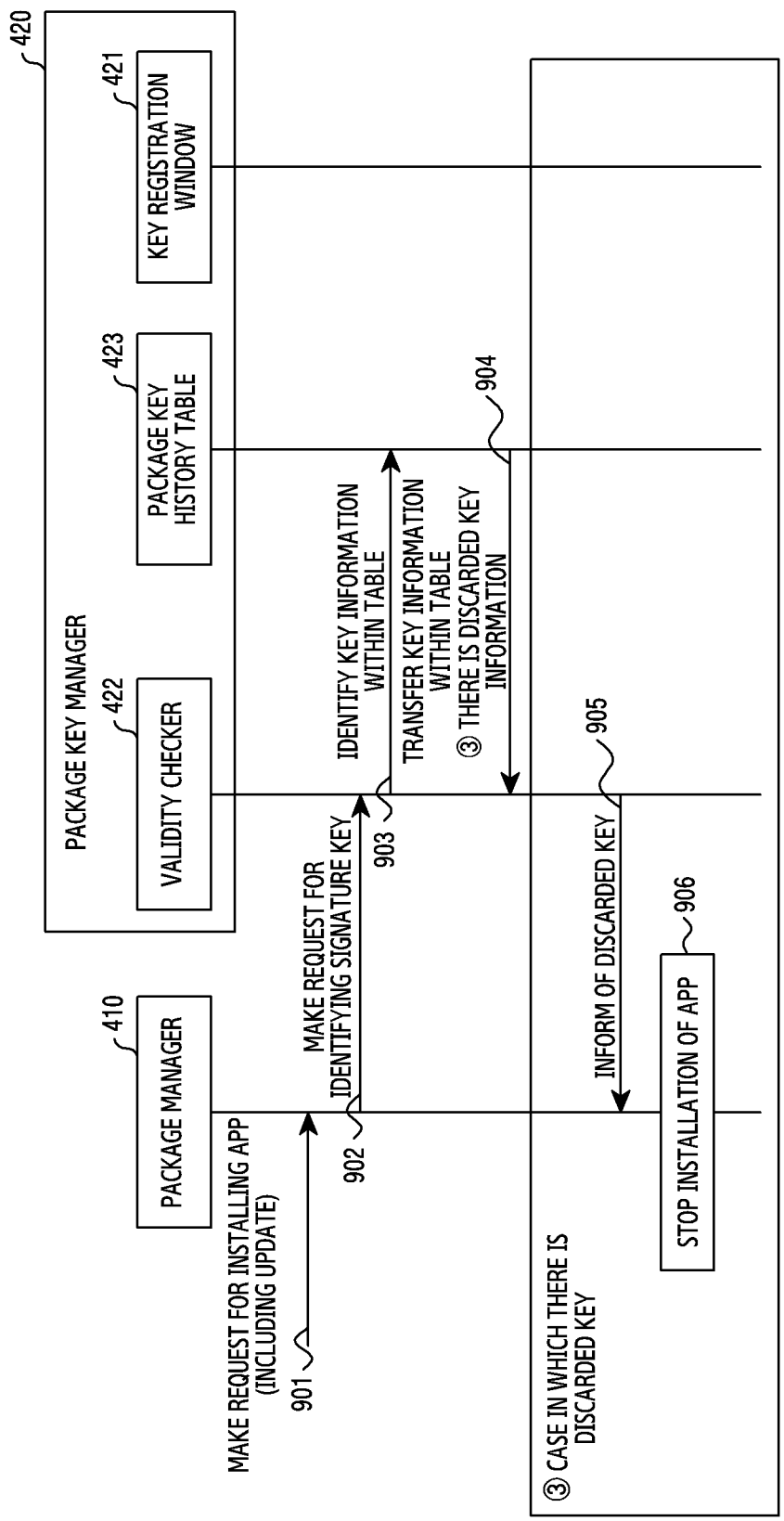
FIG. 9 is a flowchart illustrating a method of determining whether to install an application when there is discarded key information in the package key history table of the electronic device, according to an embodiment.

FIG. 9 is a flowchart illustrating a method of determining whether to install an application when there is discarded key information in the package key history table 423 of the electronic device 300, according to an embodiment.

Referring to FIG. 9, in operation 901, the package manager 410 may acquire a request for installing (or updating) an application. When the request is acquired, the package manager 410 may make a request for identifying information on a signature key of the corresponding application to the validity checker 422 in operation 902. In operation 903, the validity checker 422 may check information on the corresponding signature key within the table (for example, database) of the package key history table 423 according to the request in operation 902. In operation 904, the package key history table 423 may transfer the identified information on the signature key to the validity checker 422 and, for example, transfer information indicating that the information on the corresponding signature key is discarded from the table. In operation 905, the validity checker 422 may transfer a notification indicating that the corresponding key is a discarded key to the package manager 410 according to the information received in operation 904, and the package manager 410 may prevent installation (or update) of the application requested in operation 901 in operation 906 after identifying that the key manager is not valid from the package key manager 420.

When security is not guaranteed, through operations 901 to 906 of FIG. 9, the processor 310 may prevent installation of the application and integratively manage signature key information of applications through the package key history table 423.

Operation 701, operation 801, and operation 901 in FIGS. 7 to 9 may correspond to operation 610 in FIG. 6, operation 702 to operation 703, operation 802 to operation 803, and operation 902 to operation 903 in FIGS. 7 to 9 may correspond to operation 620 in FIG. 6, operation 704 to operation 711 in FIG. 7 may correspond to operation 650 and operation 660 in FIG. 6, operation 804 to operation 806 in FIG. 8 may correspond to operation 630 in FIG. 6, and operation 904 to operation 906 in FIG. 9 may correspond to operation 640 in FIG. 6.

Figure 10:
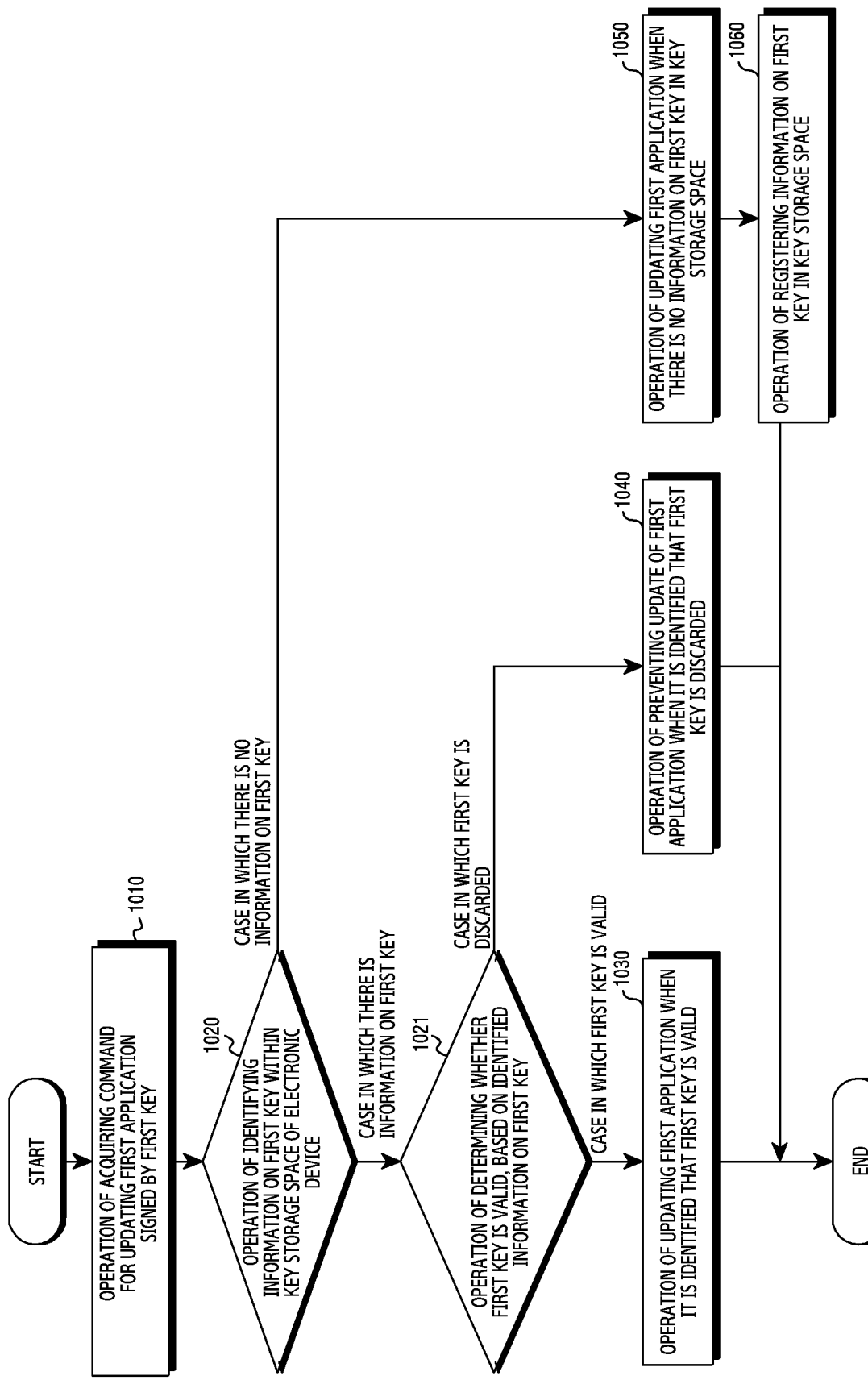
FIG. 10 is a flowchart illustrating a method of managing a signature key by an electronic device, according to an embodiment.

FIG. 10 is a flowchart illustrating a method of managing a signature key by an electronic device, according to an embodiment. In the following embodiment, respective operations may be sequentially performed, but the sequential performance is not necessary. For example, orders of the operations may be changed, and at least two operations may be performed in parallel.

The operation in FIG. 10 may be performed by the electronic device 300 of FIG. 3 or the application frameworks 400 of FIG. 4. Referring to FIG. 10, the processor 310 of the electronic device 300 according to an embodiment may perform an operation 1010 of acquiring a command for updating the first application 321 signed by a first key, an operation 1020 of identifying information on the first key within a key storage space of the electronic device 300 (for example, the package key history table 423 of FIG. 4), an operation 1021 of determining whether the first key is valid on the basis of the identified information on the first key, an operation 1030 of updating the first application 321 when it is identified that the first key is valid, and an operation 1040 of preventing the update of the first application 321 when it is identified that the first key is discarded, and may further perform an operation 1050 of updating the first application 321 when there is no information on the first key in the key storage space and an operation 1060 of registering the information on the first key in the key storage space and discarding information the original key signing the first application registered in the key storage space when there is no information on the first key in the key storage space.

Operation 1010 to operation 1050 in FIG. 10 may correspond to operations 610 to 650 in FIG. 6, the operations in FIG. 6 are described in terms of installation of the first application 321 in the electronic device 300, and the operations in FIG. 10 are described in term of the update of the first application 321 pre-installed in the electronic device 300. Hereinafter, operation 1060 of FIG. 10 is described.

When there is no information on the first key in the key storage space (for example, the package key history table 423 of FIG. 4), the processor 310 according to an embodiment may register the information on the first key in the key storage space and discard information on the original key signing the first application 321 registered in the key storage space in operation 1060. For example, the nonexistence of the information on the first key in the key storage space even though the first application 321 is pre-installed in the electronic device 300 may mean that a request for updating the first application 321 by the first key different from the original key used to sign while the first application 321 is installed in the electronic device 300 is made. According to an embodiment, no information on the first key in the key storage space found by the processor 310 may mean that the original key of the first application 321 is changed to the first key by the developer since a problem in security of the original key occurs, and accordingly, the processor 310 may approve the update of the first application 321 while discarding the pre-registered original key and newly registering the first key. According to an embodiment, operation 1050 and operation 1060 may be performed sequentially, in parallel, simultaneously at the same time, or operation 1050 may be performed after operation 1060. For example, when there is no information on the first key in the key storage space, the processor 310 may discard the original key and newly register the first key after updating the first application 321, update the first application 321 after discarding the original key and newly registering the first key, or update the first application 321, discard the original key, and newly register the first key at the same time.

Figure 11:
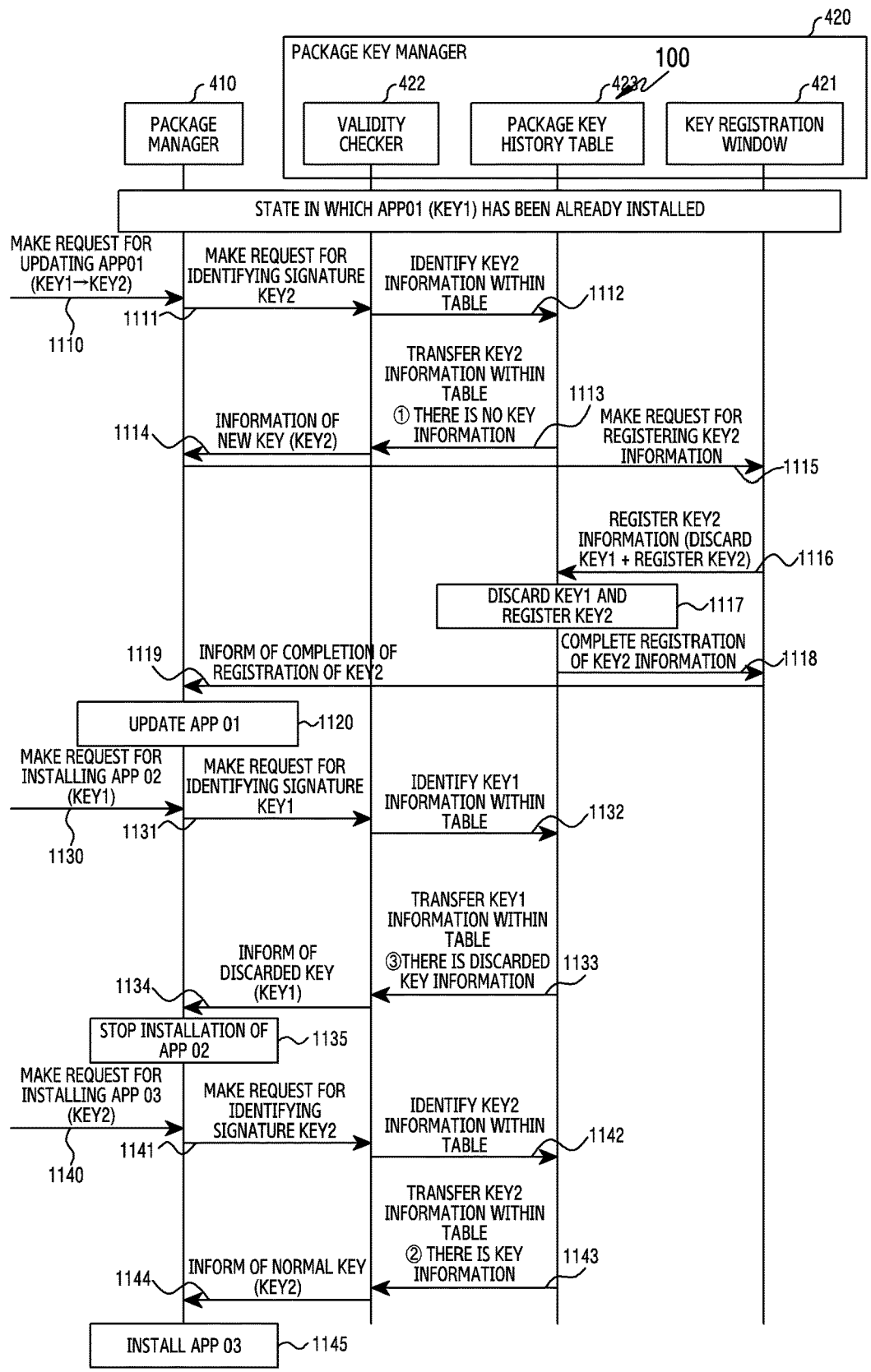
FIG. 11 is a flowchart illustrating a method of managing a signature key when there is a request for updating or installing an application from the electronic device, according to an embodiment.

FIG. 11 is a flowchart illustrating a method of managing a signature key when there is a request for updating an application from the electronic device 300, according to an embodiment.

Referring to FIG. 11, it is assumed that the first application is installed in the electronic device 300 and information on the first key used to sign when the first application is installed is registered in the package key history table 423. According to an embodiment, the package manager 410 may acquire a request for updating the first application signed by a second key in operation 1110 in the state in which the first application signed by the first key is pre-installed. When the request is acquired, the package manager 410 may make a request for identifying information on the second key to the validity checker 422 in operation 1111. In operation 1112, the validity checker 422 may check the information on the second key within the table (for example, database) of the package key history table 423 according to the request in operation 1111. In operation 1113, the package key history table 423 may transfer the identified information on the second key to the validity checker 422 and, for example, transfer information indicating that there is no information on the corresponding second key in the table. The validity checker 422 may transfer a notification indicating that the second key is a new key to the package manager 410 according to the information received in operation 1113 in operation 1114, and the package manager 410 may make a request for registering the information on the second key to the key registration window 421 in operation 1115. The key registration window 421 may make a request for discarding the first key corresponding to the original key and registering the information on the second key corresponding to the new key to the package key history table 423 according to the request in operation 1115 in operation 1116, and the package key history table 423 may discard the information on the first key from the table and register the information on the second key in the table in operation 1117. The package key history table 423 may inform the key registration window 421 of completion of the registration of the second key in operation 1118, and the key registration window 421 may finally transfer a notification indicating the completion of the registration of the corresponding key to the package manager 410 according to the information received in operation 1118 in operation 1119. In operation 1120, after identifying the completion of the registration of information on the second key in the package key manager 420, the package manager 410 may update the first application requested in operation 1110.

Through operation 1110 to operation 1120 of FIG. 11, the processor 310 may update the first application in the state security is guaranteed and integratively manage key information within the package key history table 423.

Referring back to FIG. 11, in the state in which the first application signed by the second key is updated, the package manager 410 may acquire a request for installing a second application signed by the first key in operation 1130. When the request is acquired, the package manager 410 may make a request for identifying information on the first key to the validity checker 422 in operation 1131. In operation 1132, the validity checker 422 may check information on the first key within the table (for example, database) of the package key history table 423 according to the request in operation 1131. In operation 1133, the package key history table 423 may transfer the identified information on the first key to the validity checker 422 and, for example, transfer information indicating the information on the first key is discarded from the table. The validity checker 422 may transfer a notification indicating that the first key is discarded from the package key history table 423 to the package manager 410 according to the information received in operation 1133 in operation 1134, and the package manager 410 may prevent installation of the first application requested in operation 1130 after identifying that key information is not valid from the package key manager 420 in operation 1135.

Through operation 1130 to operation 1135 of FIG. 11, the processor 310 may prevent installation of the second application signed by the first key, of which security is not guaranteed, and integratively manage key information within the package key history table 423.

Referring back to FIG. 11, in the state in which the first application signed by the second key is updated, the package manager 410 may acquire a request for installing a third application signed by the second key in operation 1140. When the request is acquired, the package manager 410 may make a request for identifying information on the second key to the validity checker 422 in operation 1141. In operation 1142, the validity checker 422 may check information on the second key within the table (for example, database) of the package key history table 423 according to the request in operation 1141. In operation 1143, the package key history table 423 may transfer the identified information on the second key to the validity checker 422 and, for example, transfer the valid existence of the information on the second key within the table. The validity checker 422 may transfer a notification indicating the at the second key is a valid key to the package manager 410 according to the information received in operation 1143 in operation 1144, and the package manager 410 may install the third application requested in operation 1140 after identifying that the second key is valid in operation 1145.

Through operation 1140 to operation 1145 of FIG. 11, the processor 310 may approve installation of the third application signed by the second key of which security is guaranteed and integratively manage key information within the package key history table 423.

According to an embodiment, the second application and the third application may be applications which have the same shared UID as the first application and can mutually share resource or may be separate applications having different UIDs. For example, when the developer has the first key used to sign when the first application is initially developed stolen and changes the original first key of the first application to the second key, the electronic device 300 may discard the first key from the package key history table 423 and register the second key when the first application is updated, so as to integratively manage signature keys and prevent installation of the second application signed by the stolen first key in the electronic device 300.

Figure 12:
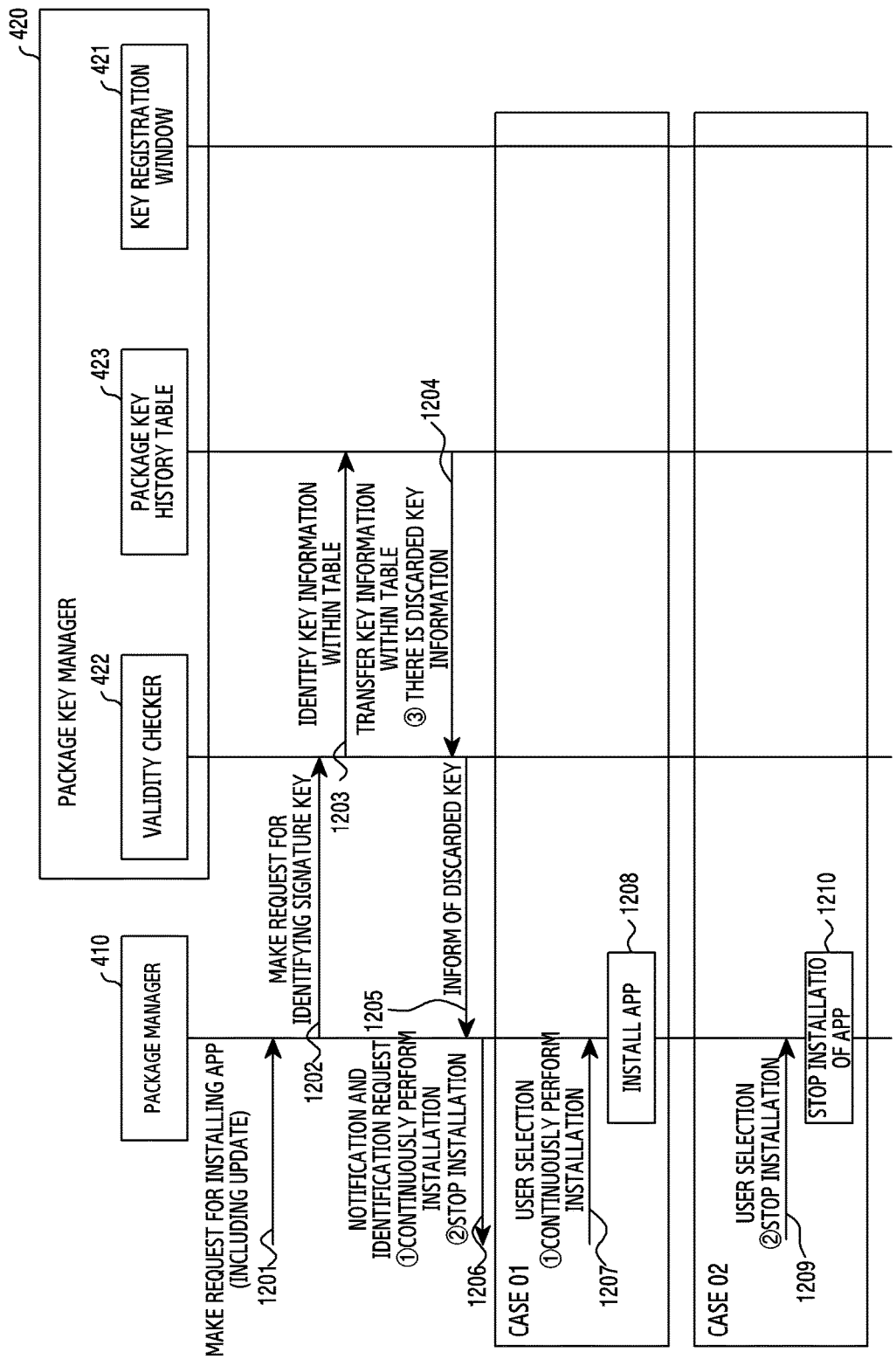
FIG. 12 is a flowchart illustrating a method of managing a signature key by the electronic device capable of selecting whether to install the application, according to an embodiment.

FIG. 12 is a flowchart illustrating a method of managing a signature key by the electronic device 300 capable of selecting whether to install an application, according to an embodiment. According to an embodiment, the processor 310 may determine whether to install a corresponding application according to a user selection even through there is a request for installing the application signed by a discarded key.

Referring to FIG. 12, in operation 1201, the package manager 410 may acquire a request for installing (or updating) an application. When the request is acquired, the package manager 410 may make a request for identifying information on a signature key of the corresponding application to the validity checker 422 in operation 1202. In operation 1203, the validity checker 422 may check information on the corresponding signature key within the table (for example, database) of the package key history table 423 according to the request in operation 1202. In operation 1204, the package key history table 423 may transfer the identified information on the signature key to the validity checker 422. For example, the package key history table 423 may transfer information indicating that the information on the corresponding signature key is discarded from the table to the validity checker 422. The validity checker 422 may transfer a notification indicating that the corresponding key is a discarded key to the package manager 410 according to the information received in operation 1204 in operation 1205, and the package manager 410 may inform the outside (for example, the user) that security of the corresponding application is not guaranteed and induce the user to select whether to install the application in operation 1206. For example, the package manager 410 may output a warning message about security of the application through the display of the electronic device 300 and induce the user to make an input indicating whether to continuously install the application. The package manager 410 may acquire an input of approving installation of the application in operation 1207 and, when the input is acquired, install (or update) the application requested in operation 1201 in operation 1208. The package manager 410 may acquire an input of preventing installation of the application in operation 1209 and, when the input is acquired, stop the installation (or update) of the application requested in operation 1201 in operation 1210.

Through operation 1201 to operation 1210 of FIG. 12, the processor 310 may determine whether to install the application according to a user input even though security is not guaranteed.

Figure 13:
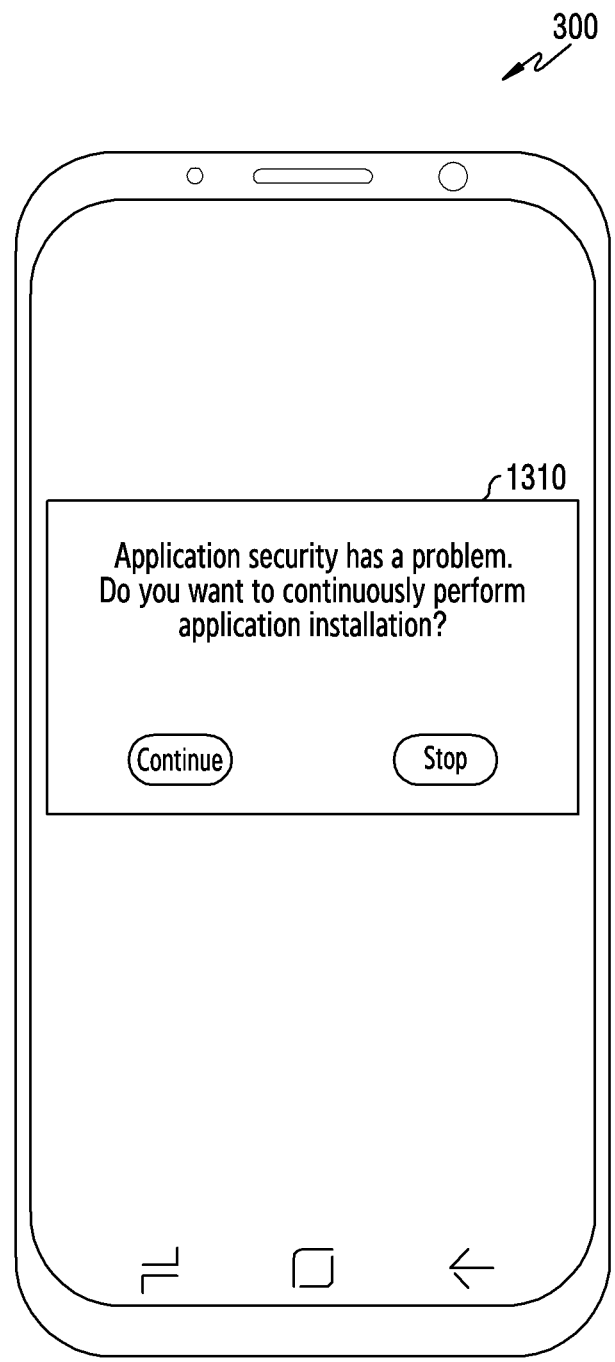
FIG. 13 illustrates a method of selecting whether to stop installation of the application in the electronic device by the user, according to an embodiment.

FIG. 13 illustrates a method of selecting whether to stop installation of the application in the electronic device 300 by the user, according to an embodiment.

According to an embodiment, FIG. 13 may be an example of operation 1206 of FIG. 12, and the package manager 410 may inform the outside (for example, the user) that security of the corresponding application is not guaranteed and induce the user to select whether to install the application. Referring to FIG. 13, when it is identified that a security key of the application to be installed is discarded, the processor 310 may output a popup message 1310 inquiring of whether to continuously install the corresponding application. According to an embodiment, the processor 310 may continuously install the corresponding application or stop the application in response to a user input for the message.

Figure 14:
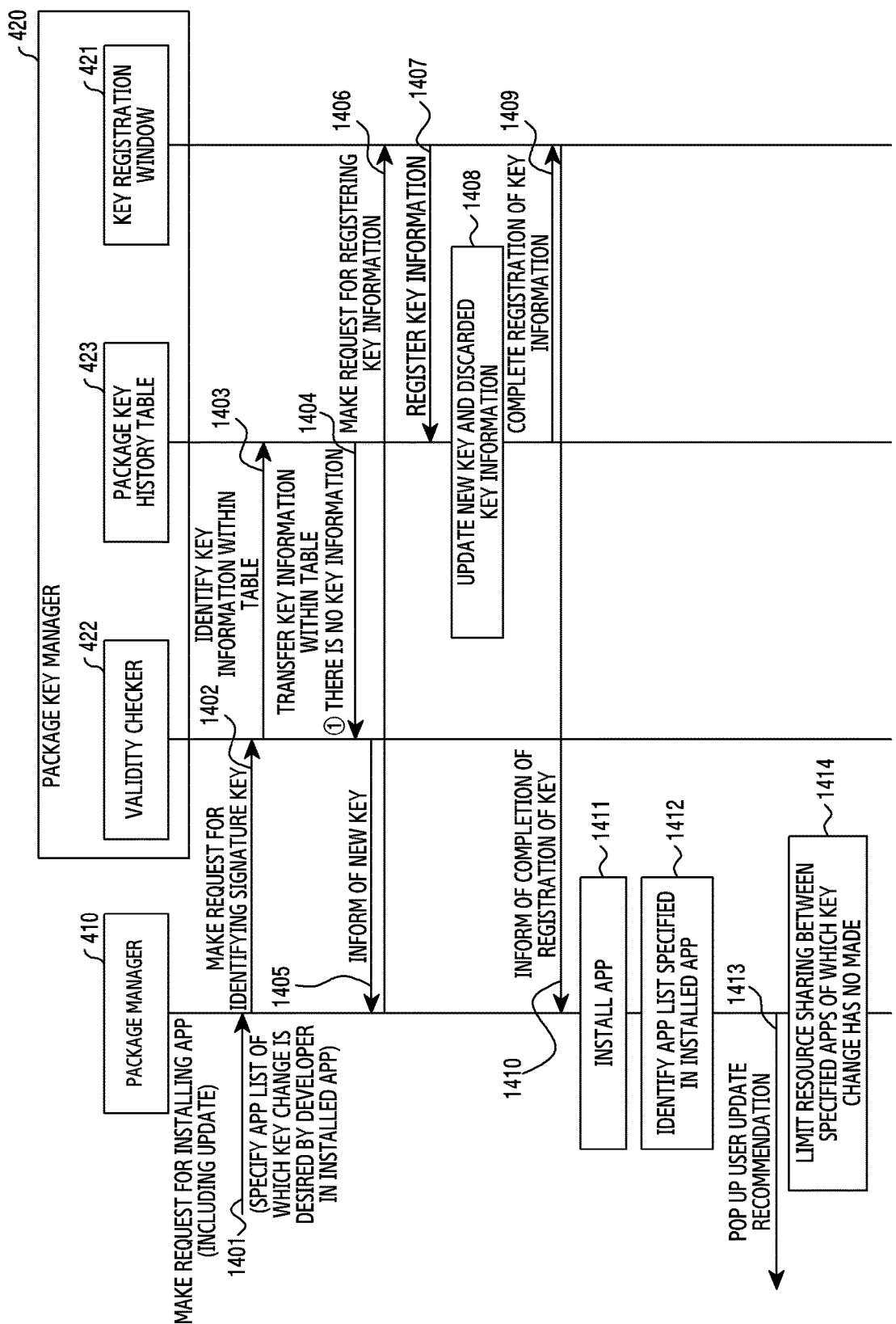
FIG. 14 is a flowchart illustrating a method of managing a signature key by the electronic device when an application list of which a key change is required is specified in the electronic device, according to an embodiment.

FIG. 14 is a flowchart illustrating a method of managing a signature key by the electronic device 300 when an application list of which a key change is required is specified in the electronic device 300, according to an embodiment.

According to an embodiment, the developer may specify a list of applications of which a key change (or application update) is required while changing a signature key when the application is signed. In this case, when installing (or updating) the application signed by the changed key, the processor 310 may also induce an update of another application in the list and block resource sharing with the application signed by the changed key before the update is completed.

Referring to FIG. 14, in operation 1401, the package manager 410 may acquire a request for installing (or updating) the application, and a list of applications of which a key change is required may be specified along with the corresponding application. When the request is acquired, the package manager 410 may make a request for identifying information on a signature key of the corresponding application to the validity checker 422 in operation 1402. In operation 1403, the validity checker 422 may check information on the corresponding signature key within the table (for example, database) of the package key history table 423 according to the request in operation 1402. In operation 1404, the package key history table 423 may transfer the identified information on the signature key to the validity checker 422, for example, information indicating that there is no information on the corresponding signature key within the table. The validity checker 422 may transfer a notification indicating that the corresponding key is a new key to the package manager 410 according to the information received in operation 1404 in operation 1405, and the package manager 410 may make a request for registering information on the new key to the key registration window 421 in operation 1406. The key registration window 421 may make a request for registering new key information to the package key history table 423 according to the request in operation 1406 in operation 1407, and the package key history table 423 may register information on the corresponding new key in the table and discard the old key in operation 1408. The package key history table 423 may inform the key registration window 421 of completion of the registration of the new key in operation 1409, and the key registration window 421 may finally transfer a notification indicating the completion of the registration of the corresponding key to the package manager 410 according to the information received in operation 1409 in operation 1410. In operation 1411, after identifying completion of the registration of key information in the package key manager 420, the package manager 410 may install (or update) the application requested in operation 1401. The package manager 410 may identify the specified list in operation 1412 and induce the update of the application installed in the electronic device 300 among applications in the list in operation 1413. For example, the package manager 1410 may output an update recommendation message of applications in the list through the display of the electronic device 300 and induce the user to make an input indicating whether to update the applications in the list. According to an embodiment, the package manager 410 may perform the requested update in response to an input of approving the update of the application in the list or stop the update in response to an input of preventing the update of the application in the list. In operation 1414, the package manager 410 may limit resource sharing with the application (or the application installed in operation 1411) of which the update is completed among applications of which the update is not performed and thus the key change is not made.

According to an embodiment, operation 1413 and operation 1414 may be performed sequentially, in parallel, substantially at the same time, or operation 1413 may be performed after operation 1414.

According to an embodiment, the application requested to be installed in operation 1401 and the applications in the application list of which the key change is required may be applications having the same shared UID. For example, through operation 1412 to operation 1414, the processor 310 may limit resource sharing even though the application having the changed key and the application having a security problem (for example, application having no key change among the applications in the list) use the same shared UID.

In the method of managing the signature key of the electronic device 300, the names of the package key manager 420, and the key registration window 421, the validity checker 422, and the package key history table 423 included in the package key manager 420 are only examples, and functions thereof are not limited by the names.

In the method of managing the signature key of the electronic device 300, the configuration of the package key manager 420 is only an example, and at least one element (for example, the key registration window 421 or the validity checker 422) may be omitted. For example, the package manager 410 may directly make a request for identifying the signature key or a request for registering a new key to the package key history table 423 and directly receive identified signature key information from the package key history table 423.

As described above, according to an embodiment, a method of managing a signature key by an electronic device (for example, the electronic device 101 of FIG. 1 or the electronic device 300 of FIG. 3) may include an operation (for example, operation 610 of FIG. 6) of acquiring command for installing a first application signed by a first key, an operation (for example, operation 620 of FIG. 6) of identifying information on the first key within a key storage space of the electronic device, an operation (for example, operation 630 of FIG. 6) of installing the first application when it is identified that the first key is valid, and an operation (for example, operation 640 of FIG. 6) of preventing installation of the first application when it is identified that the first key is discarded.

According to an embodiment, the operation (for example, operation 620 of FIG. 6) of identifying the information on the first key within the key storage space may include an operation of identifying whether a status flag for the first key among a plurality of keys stored in the key storage space indicates validity or discarding.

According to an embodiment, the method of managing the signature key by the electronic device 300 may further include an operation (for example, operation 650 of FIG. 6) of installing the first application when there is no information on the first key.

According to an embodiment, the method of managing the signature key by the electronic device 300 may further include an operation (for example, operation 660 of FIG. 6) of registering the information on the first key in the key storage space when there is no information on the first key.

According to an embodiment, the key storage space may include a database stored in the memory, and the database may store information on a key of an application installed in the electronic device 300.

According to an embodiment, the information on the key may include information on at least one of a history for registration of the key of the application installed in the electronic device 300 in the key storage space or a history for discarding of the key of the application installed in the electronic device which has been registered in the key storage space.

According to an embodiment, the history for discarding may include, when the application is updated by a key different from an original key used to sign when the application is installed in the electronic device 300, a history of discarding of the original key registered in the key storage space from the key storage space.

As described above, according to an embodiment, the electronic device 300 (for example, the electronic device 101 of FIG. 1) may include the memory 320 configured to store instructions and the processor 310 electrically connected to the memory 320, and the processor 310 may be configured to perform, when executing the instructions stored in the memory 320, an operation (for example, operation 1010 of FIG. 10) of acquire a command for installing a first application signed by a first key an operation (for example, operation 1020 of FIG. 10) identifying information on the first key within a key storage space of the electronic device (for example, the package key history table 423 of FIG. 4), an operation (for example, operations 1030 to 1050 of FIG. 10) of determining whether to update the first application according to the information on the first key identified in the key storage space.

According to an embodiment, when identifying the information on the first key, the processor 310 may be configured to identify whether a status flag for the first key among a plurality of keys stored in the key storage space indicates validity or discarding.

According to an embodiment, when determining whether to update the first application, the processor 310 may be configured to perform an operation (for example, operation 1030 of FIG. 10) of updating the first application when it is identified that the first key is valid, an operation (for example, operation 1040 of FIG. 10) of preventing the update of the first application when it is identified that the first key is discarded, and an operation (for example, operation 1050 of FIG. 10) of updating the first application when the information on the first key does not exist in the key storage space.

According to an embodiment, when the information on the first key does not exist in the key storage space, the processor 310 may be configured to perform an operation of registering the information on the first key in the key storage space and an operation (for example, operation 1060 of FIG. 10) of discarding information on an original key signing the first application registered in the key storage space.

According to an embodiment, the first application may be an application which is signed by the same original signature key as the second application and has the same shared UID.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a memory storing instructions and information on applications installed in the electronic device; and
a processor configured to execute the instructions to:
acquire a command for installing a first application signed by a first key,
identify information on the first key within a key storage space stored in the memory of the electronic device, wherein the information on the first key is stored in the key storage space separately from a storage space storing the information on applications,
install the first application in response to determining that the first key is valid based on the identified information, and
prevent installation of the first application in response to determining that the first key is discarded based on the identified information,
wherein, when identifying the information on the first key, the processor is further configured to execute the instructions to:
identify a status flag for the first key among a plurality of keys stored in the key storage space, the status flag indicating whether either the first key is valid or the first key was registered in the key storage space and then discarded.

2. The electronic device of claim 1, wherein, in response to identifying that the information on the first key does not exist within the key storage space, the processor is further configured to execute the instructions to:
install the first application.

3. The electronic device of claim 2, wherein, in response to identifying that the information on the first key does not exist within the key storage space, the processor is further configured to execute the instructions to:
register the information on the first key in the key storage space.

4. The electronic device of claim 1, wherein the key storage space comprises a database that stores information on a key of an application installed in the electronic device.

5. The electronic device of claim 4, wherein the information on the key of the application installed in the electronic device comprises at least one of a history for registration of the key in the key storage space or a history for discarding of the key which has been registered in the key storage space.

6. The electronic device of claim 5, wherein the history for discarding of the key comprises, a history of discarding an original key used to sign when the application is installed in the electronic device registered in the key storage space, when the application is updated by a key different from the original key.

7. The electronic device of claim 1, wherein the first application is signed by an original signature key equal to a second application and has an equal shared user identification (UID), and the processor is configured to determine whether to share resources between the first application and the second application according to whether an application list included in the first application identifies the second application.

8. The electronic device of claim 1, wherein in response to determining that the first key is discarded based on the identified information, the processor is further configured to execute the instructions to:
determine whether to prevent installation of the first application in response to a user input.

9. A method of managing a signature key by an electronic device, the method comprising:
acquiring a command for installing a first application signed by a first key;
identifying information on the first key within a key storage space of the electronic device, wherein the information on the first key is stored in the key storage space separately from a storage space storing information on applications;
installing the first application in the electronic device in response to determining that the first key is valid based on the identified information; and
preventing installation of the first application in response to determining that the first key is discarded based on the identified information,
wherein the identifying of the information on the first key within the key storage space comprises identifying a status flag for the first key among a plurality of keys stored in the key storage space, the status flag indicating whether either the first key is valid or the first key was registered in the key storage space and then discarded.

10. The method of claim 9, further comprising:
installing the first application, in response to identifying that the information on the first key does not exist within the key storage space; and
registering the information on the first key in the key storage space, in response to identifying that the information on the first key does not exist within the key storage space.

11. The method of claim 9, wherein the key storage space comprises a database that stores information on a key of an application installed in the electronic device.

12. The method of claim 11, wherein the information on the key of the application installed in the electronic device comprises at least one of a history for registration of the key in the key storage space or a history for discarding of the key which has been registered in the key storage space.

13. The method of claim 12, wherein the history for discarding of the key comprises, a history of discarding of an original key used to sign when the application is installed in the electronic device registered in the key storage space, when the application is updated by a key different from the original key.

14. A non-transitory computer readable medium for storing computer readable program code or instructions for carrying out operations, when executed by a processor, for managing a signature key by an electronic device, the operations comprising:
acquiring a command for installing a first application signed by a first key;
identifying information on the first key within a key storage space of the electronic device, wherein the information on the first key is stored in the key storage space separately from a storage space storing information on applications;
installing the first application in the electronic device in response to determining that the first key is valid based on the identified information; and
preventing installation of the first application in response to determining that the first key is discarded based on the identified information,
wherein the identifying of the information on the first key within the key storage space comprises identifying a status flag for the first key among a plurality of keys stored in the key storage space, the status flag indicating whether either the first key is valid or the first key was registered in the key storage space and then discarded.

15. The non-transitory computer readable medium of claim 14, further comprising:
installing the first application, in response to identifying that the information on the first key does not exist within the key storage space; and
registering the information on the first key in the key storage space, in response to identifying that the information on the first key does not exist within the key storage space.

16. The non-transitory computer readable medium of claim 14, wherein the key storage space comprises a database that stores information on a key of an application installed in the electronic device.

17. The non-transitory computer readable medium of claim 16, wherein the information on the key of the application installed in the electronic device comprises at least one of a history for registration of the key in the key storage space or a history for discarding of the key which has been registered in the key storage space.

* * * * *